May 11, 1954 R. C. BALLARD 2,678,348

COLOR TELEVISION INTERLACING SYSTEM

Filed Sept. 24, 1949 5 Sheets-Sheet 1

INVENTOR
RANDALL C. BALLARD
BY
[signature]
ATTORNEY

May 11, 1954 R. C. BALLARD 2,678,348

COLOR TELEVISION INTERLACING SYSTEM

Filed Sept. 24, 1949 5 Sheets-Sheet 2

INVENTOR
RANDALL C. BALLARD
BY
[signature]
ATTORNEY

INVENTOR
RANDALL C. BALLARD
BY
ATTORNEY

INVENTOR
RANDALL C. BALLARD
BY
[signature]
ATTORNEY

COLOR TELEVISION INTERLACING SYSTEM

Filed Sept. 24, 1949 5 Sheets-Sheet 5

INVENTOR
RANDALL C. BALLARD
BY
ATTORNEY

Patented May 11, 1954 2,678,348

UNITED STATES PATENT OFFICE 2,678,348

COLOR TELEVISION INTERLACING SYSTEM

Randall C. Ballard, Trenton, N. J., assignor to Radio Corporation of America, a corporation of Delaware Application September 24, 1949, Serial No. 117,528

20 Claims. (Cl. 178—5.2)

This invention relates to apparatus for televising colored images in a manner that increases the effective use of a given frequency band and, in particular, but not necessarily limited thereto, in a manner that is compatible with present standards of monochrome transmission.

Whereas sequential color television systems have been demonstrated that are capable of transmitting colored images in accordance with present monochrome standards, some of them cannot be said to be compatible from a practical point of view. For example, in the present state of the art, it has been found preferable to operate field sequential systems at scanning frequencies different from those required by present monochrome standards in order to reduce flicker and color break-up. The scanning frequencies presently employed also have a tendency to reduce the available detail in both color and monochrome reproduction below that available in present monochrome systems.

Instead of varying the transmitted signal in accordance with a single component color during each field, systems have previously been suggested in which the color is changed from element to element as each horizontal line of the raster is scanned, and the position of the element corresponding to any given color with respect to each horizontal line of the raster is always the same. Such an elemental sequential system has the advantage of reducing large area flicker and color break-up that necessitated the non-compatible operation of the field sequential systems.

In order to improve the detail and other aspects of the images reproduced in this type of elemental sequential transmission, it would be possible to shift the position of the elemental areas each time a given line of the raster is scanned in such manner that each elemental area is exposed to a different component color on successive scans. However, in a three color field sequential system if such a horizontal interlacing method were employed in combination with present black and white alternate line interlacing, twelve fields are necessary to complete the color information, and the colored image repetition rate of five a second thus produced is low enough to cause flickering at reasonable image intensities. Speeding up the repetition rate so as to eliminate flicker results in a non-compatible system and is therefore objectionable.

Images transmitted in accordance with this invention within the limitations of present monochrome standards whether they be reproduced by a current black-and-white receiver or by a receiver constructed in accordance with this invention, are free from noticeable flicker and crawl and exhibit a large amount of detail.

In accordance with one aspect of this invention, improvements of this type are achieved by shifting the phase of the sequentially occurring colored elements with respect to a given point on a horizontal line of the raster on successive scans of a given line so that only two scans of such a line are required to completely reproduce all the color information. As applied to systems similar to that required by present monochrome standards, wherein line interlacing is employed, this means that only four fields are required to complete the color information of an image. Inasmuch as present standards require a field repetition rate of sixty fields a second, this means that a complete image is formed 15 times a second, and this is a sufficiently high repetition rate to avoid objectionable flicker. Furthermore, by changing of the phasing of the sequentially occurring colored elements as the scanning proceeds from one line, field, or frame to another line, field, or frame, the phenomenon known as crawl can be reduced so that it is not noticeable.

Accordingly, the object of this invention is to provide an improved means of transmitting colored images within a given bandwidth.

Another object of the invention is to provide an improved means of interlacing in an elemental sequential system in such manner that a complete colored image can be received in four fields in accordance with present monochrome standards.

A further object of this invention is to provide an improved means of interlacing the colors in an elemental sequential television system in such manner as to minimize the effects of crawl and flicker.

A still further object of the invention is to provide an improved means of transmitting colored images in such manner that the signals can be reproduced in monochrome by receivers constructed in accordance with present standards.

These and other objects will become apparent from a detailed consideration of the following figures in which.

Figure 8B:
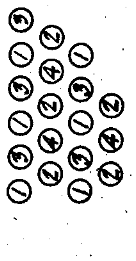
Figure 8A:
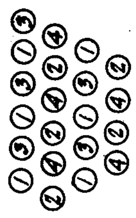
Figure 8:
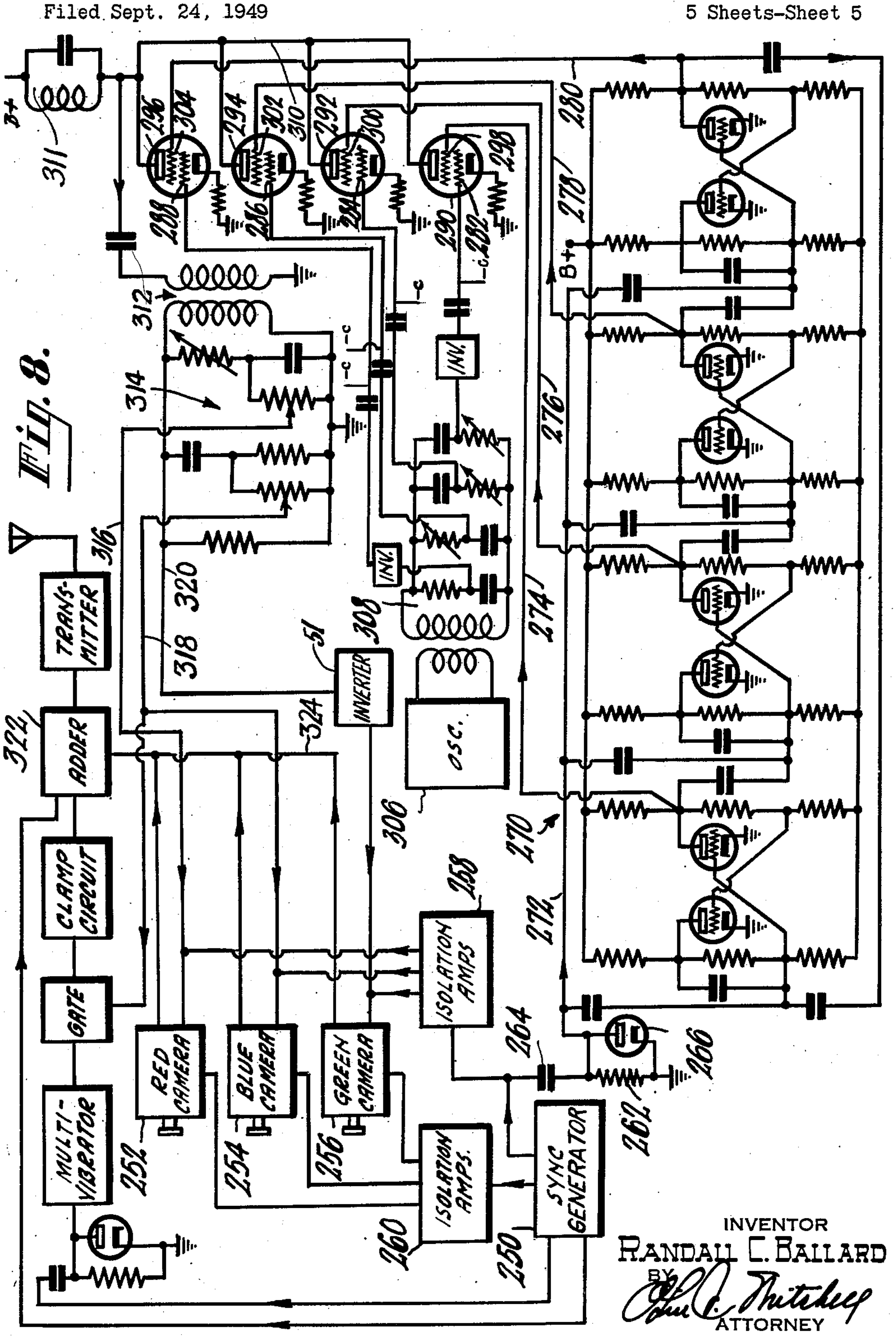

Figure 8 shows in schematic form an arrangement embodying the principles of the invention in which any desired phase change of the multiplexed signals with respect to the horizontal lines may be achieved; and Figures 8A and 8B show dot patterns that may be obtained when apparatus shown in Figure 8 is used to change the phase of the multiplexed color signals by multiples of 90° at the end of each field.

Figure 1:
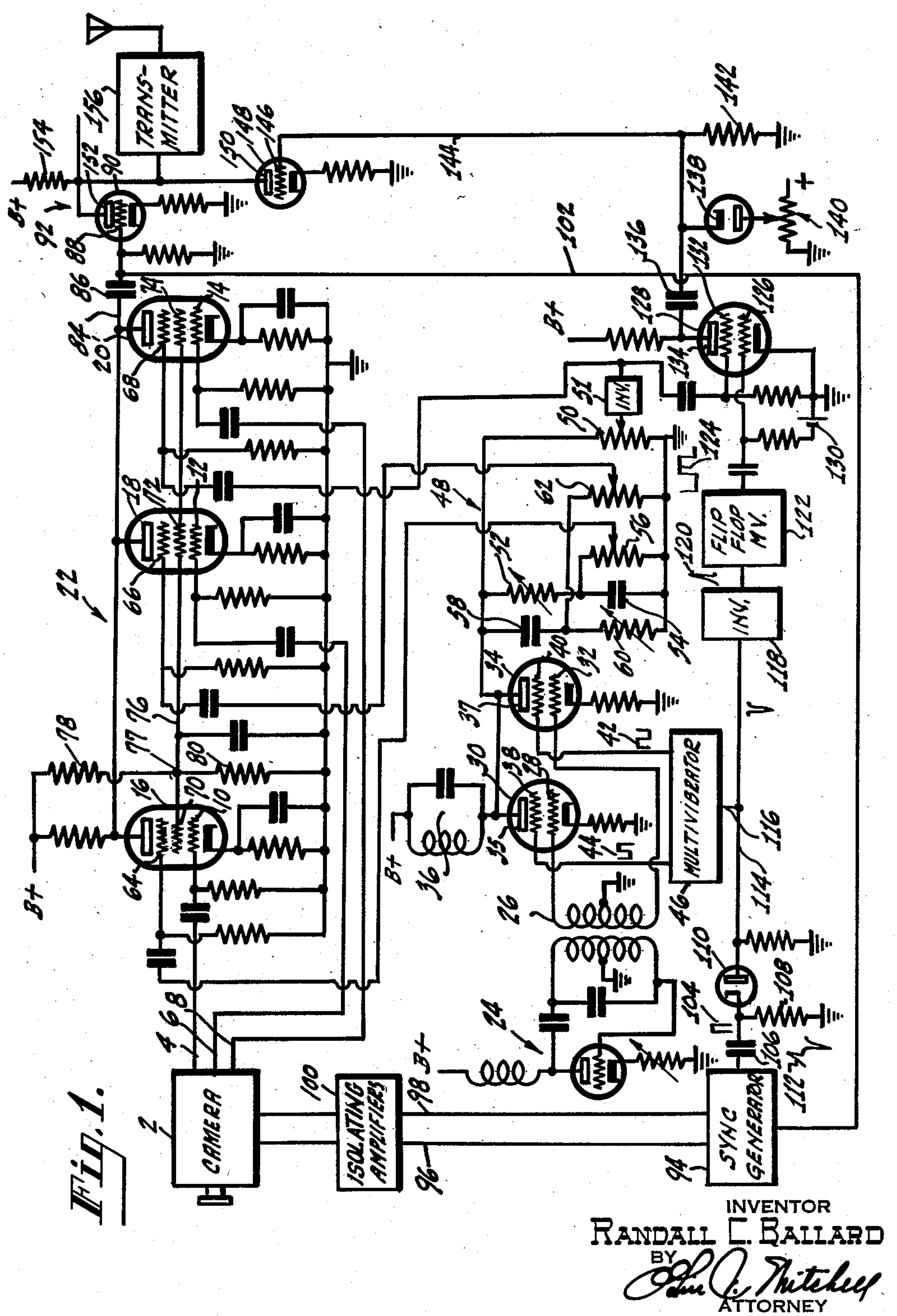
Figure 1 is a schematic diagram of a transmitter in which the phasing of the multiplexed colored dots with respect to the horizontal lines of the raster is changed by 180° on successive lines.
Figures 1A, 3, 3A, 4, 5:
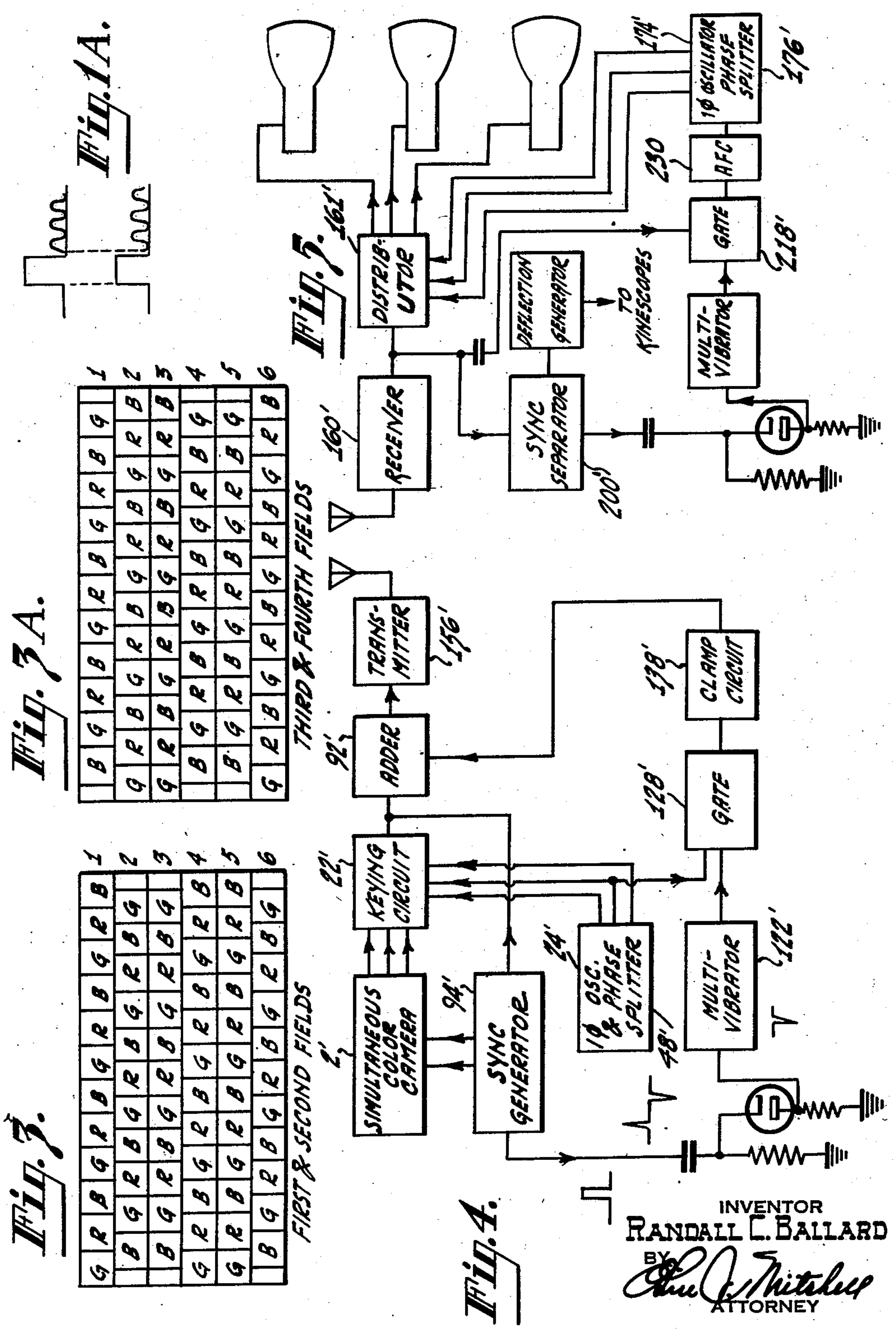
Figure 1A illustrates the waveform employed for synchronizing the multiplexing at a receiver with the multiplexing at the transmitter and its position relative to the standard sync and blanking pulses.
Figure 3 and Figure 3A illustrate the dot pattern of the multiplexed colored signals that are formed by the embodiments of the invention shown in Figures 1 and 2.
Figure 4 illustrates in block diagram form a transmitter in which any desired phase change of the multiplexed colored signals with respect to the horizontal line may be achieved by the selection of a proper keying frequency.
Figure 5 illustrates in block diagram form a receiver adapted to reproduce colored images from the signals transmitted by the transmitter shown in Figure 4.

In Figure 1 of the drawings there is shown a transmitter that is adapted to multiplex three component colors and to doubly interlace them in a horizontal direction. The phasing of the multiplexed signals is changed by 180° on each successive scanned line of a raster so as to produce a field pattern such as indicated in Figures 3 and 3A in which each square represents a dot on the screen. Because of overlapping of the dots each square may be approximately 50 percent longer than shown. During the first scanning field illustrated in Figure 3 the odd numbered lines are scanned in order. That is, the three colored dots are laid down in order along line 1 as shown. Next, line 3 is scanned with a displacement of one and one half squares for each color. The remaining odd lines are scanned in order with the colored dot pattern shown.

Inasmuch as there is an odd number of lines in each frame, comparison of Figure 3A with Figure 3 shows that when any given line is scanned a second time in the third and fourth fields the colors are laid down midway between the points established in the scanning during the first and second fields. In the example shown, the dots of any given color will be established at a point in the even numbered lines that is half way between the positions established during the scanning of the preceding odd line.

Referring to the details of Figure 1, there is shown a simultaneous color camera 2 which may, for example consist of three "Orthicon" type tubes such as illustrated in the U. S. Patent 2,377,972 issued June 12, 1945, to Schade. The cameras may be provided with colored optical filters so that the video signals corresponding to the intensity of only one component color are developed by each one and supplied by the leads 4, 6 and 8 to the grids 10, 12 and 14 of the parallel keying tubes 16, 18 and 20 respectively that form the keying circuit which also may be termed a sampler or commutator generally indicated by numeral 22. Other well known switching means for time division multiplexing or for deriving a series of signals or groups of signals during uniformly spaced intervals may be employed.

The multiplexing or basic keying frequency may be established by a single phase oscillator of any standard type generally indicated by the numeral 24. In the example shown, the midpoint of the inductance of the tank circuit is connected to ground and there is provided a push-pull output to the winding 26 that is inductively coupled with it. One end of the winding 26 is connected to the grid 28 of amplifier 30, and the opposite end of the winding 26 is connected to the grid 32 of the amplifier 34, the amplifiers being part of the means for alternately changing the phase of the multiplexed signals or, in other words, the phase of the commutator 22, with respect to line intervals. The plates 35 and 37 of the amplifiers 30 and 34 are connected to a source of fixed potential via common tank circuit 36 tuned to the keying frequency. The amplifiers 30 and 34 are alternately keyed on or off by signals supplied to the grids 38 and 40 respectively by signals 42 and 44 that are supplied by the multivibrator 46 which is another part of said phase changing means. The synchronization of these signals with the rest of the system will be explained hereinafter.

The basic keying frequency present at the plates 35 and 37 of the amplifiers 30 and 34 are applied to a phase splitting network generally indicated by the numeral 48 which may be of any type capable of operating at the keying frequency. In the illustrated form, the neutral phase is derived from potentiometer 50 which is connected from the plates 35 and 37 of the amplifiers to a source of fixed potential (in this case ground) and feeds phase inverting stage 51. The retarded phase of the keying frequency is developed by the phase shifting network comprising variable resistor 52 and condenser 54 that are connected in that order between the plates 35 and 37 and the source of fixed potential. Different amplitudes a voltage of retarded phase may be obtained at the potentiometer 56 that is connected in parallel with condenser 54. The advanced phase of the keying frequency is developed by phase shifting network comprising condenser 58 and variable resistor 60 connected in series in the order named between the plates 35 and 37 to a source of fixed potential. Different amplitudes of the advanced phase of the voltage may be derived from potentiometer 62 which is connected in parallel with the variable resistor 60.

Time division multiplexing of the video signals supplied by the camera 2 is accomplished by applying the keying potentials thus derived at the potentiometers 56, 62 and 50 to the grids 64, 66 and 68 of the parallel keying tubes 16, 18 and 20. The grids 70, 72 and 74 of the tubes 16, 18 and 20 are tied together by lead 76 and are biased by the distribution of potential available at the junction 77 between the series resistors 78 and 80, the resistor 78 being connected to a source of positive potential, and the resistor 80 being connected to a source of fixed potential. The keying tubes 16, 18 and 20 are normally conducting but are cut off during the negative excursions of the keying frequency. The plates of the successively keyed tubes 16, 18 and 20 are tied to a common output lead 84 and the multiplexed video signals present therein are coupled via condenser 86 to the grid 88 of an amplifier 90 that is one part of an adder generally indicated by the numeral 92.

Scanning control and blanking signals generated by the sync generator 94, which may be of the type described in U. S. Patent 2,258,943 issued October 14, 1941, to Bedford are applied to the simultaneous color camera 2 via the leads 96 and 98 and isolating amplifiers generally indicated by the numeral 100. Sync signals that may be required by present monochrome standards are conducted from the sync generator 94 to the grid 88 of the adder 92 via lead 102.

The following details relate to circuit arrangements for synchronizing the keying circuit 22 with the horizontal scanning operation and for transmitting signals that may be employed at the receiver so that the keying performed therein will remain in step with the keying at the transmitter. Horizontal sync pulses 104 derived from the sync generator 94 are applied to a differentiation circuit which may comprise a condenser 106 and a resistor 108 connected in series. In order that the change in phase of the keying frequency may occur on the "back porch" of the horizontal blanking pulse, diode 110 is connected in parallel with the resistor 108 in such polarity that only the negative pip of the waveform 112, characteristically provided by a differentiation circuit, is present on the lead 114. These components are therefore a source of signals for controlling the phase of the sampler. This negative pip is present in lead 114 and is applied to multivibrator 46 by lead 116. The multivibrator 46 may be of the type having two stable states, an example of which is illustrated on page 605 of the book entitled "Waveforms," by the M. I. T. Radiation Laboratory, McGraw-Hill Book Company, 1949. The waveforms 42 and 44 which are 180° out of phase may be derived from the plates of the amplifiers employed in the multivibrator 46 and are supplied, as previously described, to grids 38 and 40 of the phase inverting amplifiers 30 and 34. In this way, the phase of the voltage wave applied to the phase splitter 48 is reversed by 180° at the beginning of each line of the scanning raster.

Signals for synchronizing the multiplexing at the receiver with the multiplexing at the transmitter are developed in the following manner: The negative pip appearing on lead 114 as a result of the differentiation of the horizontal sync pulse is applied to an inverting amplifier 118 and the positive pip 120 thus produced is applied to a flip-flop multivibrator 122, which may be of the type described and illustrated on pages 166 and 167 in the above-identified book. The flip-flop multivibrator 122 is so adjusted that it provides a positive pulse 124 in response to the pulse 120 that is substantially rectangular in shape and has a duration that is less than the time interval for the "back porch" occurring after the horizontal synchronizing pulse. The pulse 124 is applied to the grid 126 of the gating amplifier 128 and is of sufficient amplitude to overcome the negative bias applied to the grid 126 from source 130. The neutral phase of the keying frequency derived at potentiometer 50 of the phase splitter 48 and inverted by amplifier 51 is coupled to the grid 132 of the gating tube 128 and is present at the plate 134 in inverted phase during the time the pulse 124 is applied to the grid 126. The burst of keying frequency thus derived at plate 134 is applied via coupling condenser 136 to a clamping circuit which may comprise a diode 138 having its plate connected to a source of positive potential which, may, for example, be potentiometer 140. The potentiometer 140 is adjusted so that the keying frequency will be clamped to the blanking level, as indicated in Figure 1A. This is done so as to avoid the possibility of unblanking the kinescope during retrace. A direct current return path for the diode 138 is provided by resistor 142 that is connected in parallel with it.

After passing through the clamping circuit the burst of keying frequency is applied via lead 144 to the grid 146 of amplifier 148 which comprises part of the adder 92. The plate 150 of amplifier 148 is tied to the plate 152 of the amplifier 90 which, as previously mentioned, forms the other part of the adder, and both of these plates are connected to a source of B+ via a common load resistor 154. The phase of this burst of keying frequency appearing across the load resistor 154 is the same phase as that present at the output of the phase inverter 51 and is applied to a transmitter 156 which may be of any type suitable for television purposes. Whether or not this transmitter is of the type employing radiated energy as shown or is the type which comprises land lines makes no difference to the operation of this invention.

The operation of the transmission system described above will now be explained. The signals provided by the simultaneous color camera 2 are continuous except for blanking intervals and are multiplexed by the keying circuit 22 so that they are repeated. The particular order of the colors makes no difference, as long as it is the same within each multiplexed group. These multiplexed video signals are then introduced into the adder 92 along with the synchronization signals necessary for controlling the scanning at the receiver. The basic keying frequency which may be 3.8 megacycles per second, by way of example, is determined by the oscillator 24 and if the variable resistors 52 and 60 of the phase splitting network 48 are properly adjusted, the keying of the signals corresponding to the three component colors will occur at properly spaced intervals. The multivibrator 46 supplies square waves 42 and 44 of opposite phase to the polarity reversing tubes 30 and 34 that have a duration equal to one horizontal line because the multivibrator stays in one polarity until it is triggered.

The negative pulse of the differentiated horizontal sync signal 104 is employed to trip multivibrator 122 so that the burst of keying frequency cannot affect the sync pulse. In a system in which there is an odd number of horizontal scanning intervals in each frame interval, such as required by present monochrome standards, the phase of the elements provided by the keying circuit 22 with respect to a horizontal line in a scanning raster will be inverted on successive lines and in any particular line will be inverted on successive scannings of that line.

Figure 2:
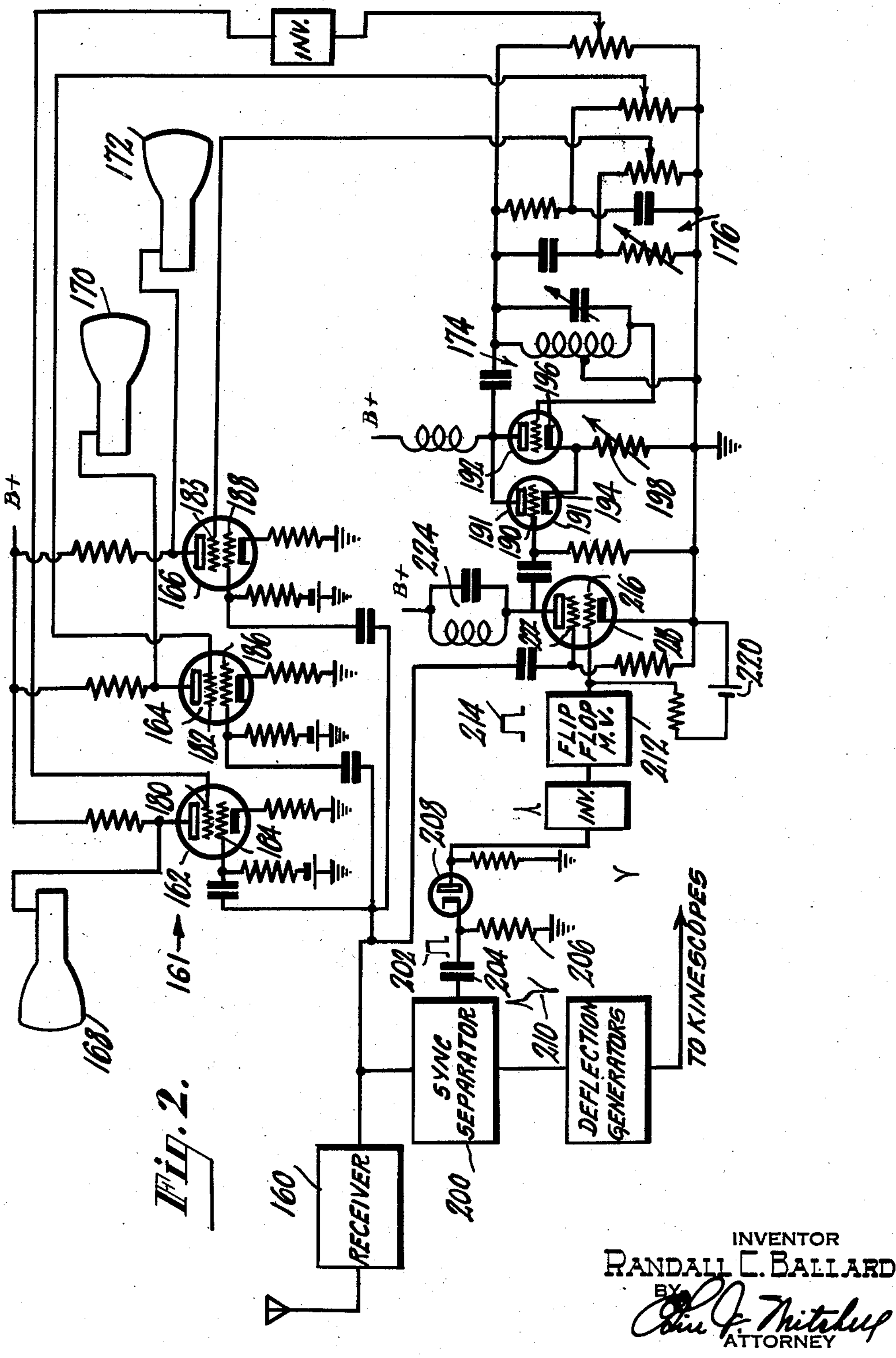
Figure 2 illustrates in schematic form the details of a receiver capable of reproducing colored images from signals conveyed by a transmitter such as is illustrated in Figure 1.

A receiver, capable of reproducing the dot pattern illustrated in Figures 3 and 3A from the signals transmitted by the transmitter just described, is illustrated in Figure 2. Receiver 160 receives and detects the video voltage waves that are impressed upon the modulator of the transmitter 156 and its output is connected directly to a means 161 for distributing the video waves to the image reproducers which may include gating isolation amplifiers 162, 164 and 166. The outputs of these amplifiers are coupled to means for reproducing the images of the different component colors which may be standard kinescopes indicated by the numerals 168, 170 and 172.

The gating isolation amplifiers 162, 164 and 166 are successively keyed during brief intervals at a frequency determined by the controlled local oscillator generally indicated by the numeral 174. The spacing of these intervals is controlled by the phase splitting network 176 that is connected to the output of the oscillator 174 and may be the same as the phase splitting network 48 described in connection with the transmitter shown in Figure 1. The outputs of the phase splitter 176 are applied to the grids 180, 182, and 183 of the respective gating isolation amplifiers 162, 164 and 166 and are of sufficient magnitude to overcome the negative bias applied to the video input grids 184, 186 and 188, respectively.

In order to synchronize the keying of the amplilers 162, 164 and 166 with the keying performed by the keying circuit 22 at the transmitter, bursts of the keying frequency occurring during the "back porch" of the transmitted signal are supplied to the grid 190 of the tube 191 that is in parallel with the tube 192 of oscillator 174. Inasmuch as the cathodes 194 and 196 are tied together and connected to a source of fixed potential by a variable resistor 198, the phase of the oscillator 174 will be forced into phase with the burst of keying frequency. Although a particular type of oscillator has been shown, it is to be realized that any type of oscillator may be substituted for the oscillator 174 that is capable of being drawn into phase by application of a short burst of alternating current of substantially the same frequency as that at which oscillations freely occur.

The short burst of the basic keying frequency of a neutral phase is provided to the oscillator 174 by a gating arrangement that is similar to that described in connection with the transmitter. The horizontal sync pulse indicated by the numeral 202 is separated from the video signals by sync separator circuit 200 which may be of the type illustrated in either of the U. S. Patents 2,219,579 issued October 29, 1940, to Poch or 2,246,659 issued June 24, 1941, to Ballard. The sync pulse 202 is applied to a differentiating network which may, for example, comprise condenser 204 and resistor 206 connected in series. The diode 208, which is connected in parallel with the resistor 206 serves to clip off the positive pulse of the waveform 210 provided by the process of differentiation and the negative pulse is supplied to a flip-flop multivibrator 212 that is the same as the flip-flop multivibrator 122 employed in the transmitter. The output of the flip-flop multivibrator 212 is a square wave 214, as shown, having a duration equal to the back porch interval and occurs immediately after the horizontal sync pulse. This output wave is applied to the grid 216 of the gating tube 218 and places it in a conducting condition, as it is of sufficient magnitude to overcome the negative bias provided by source 220 to the grid 216. The output of the receiver 160 is supplied to the grid 222 of the gating tube 218 and the 3.8 megacycle keying frequency is selectively amplified by the tank circuit 224. This keying frequency is then coupled to the grid 190 of the tube 191, as previously described.

The block diagram as shown in Figure 4 illustrates a transmitter capable of changing the phase of the multiplexed colors with respect to the horizontal scanning interval by the proper selection of a switching frequency. For purposes of convenience, the blocks containing the various groups of components shown in detail in Figure 1 are indicated by corresponding prime numerals. The circuit arrangements shown are the same as that of Figure 1 except that the multivibrator 46 and the phase inverting amplifiers 30 and 34 are not required in this embodiment of the invention. The operation of the circuit is best described by way of example. Assuming that there are 15,750 horizontal lines for each second, there would be 241 complete cycles of the keying in each line interval if a basic keying frequency of 3.795750 megacycles were used. If, however, the basic keying frequency is so chosen that N+1/2 cycles occur during each horizontal line interval, then a frequency of 3.803625 megacycles, could, for example, be used as the basic keying frequency.

(3.803,625 megacycles=241.5×15,750=
3.795.750+½×15,750)

Then the phase of successive scanned lines will be automatically shifted by 180° and no phase changing equipment is required. Inasmuch as there are an odd number of lines, successive scans of the same lines produce a similar phase change.

The primed numerals of Figure 5 indicate parts of a receiver capable of operating in conjunction with the transmitter of Figure 4 that are similar to the parts of the receiver shown in Figure 2 bearing the same numerals. The arrangement is the same as that shown in Figure 2, except that the signals supplied by the gate 218′ are passed through an automatic frequency control circuit 230 which controls the frequency of the single phase oscillator 174′. The AFC circuit may be of a standard type in which the frequency of the oscillator 174′ is compared with the keying frequency transmitted on the "back porch" during the gated intervals so as to develop a direct current potential which may be applied to a reactance tube in the oscillator circuit in a manner well known to those skilled in the art. This is a distinct advantage because the inertia of the AFC control circuit 230 can be made large enough to accurately control the phase of the single phase oscillator during an interval of at least one or more lines. In this manner, greater stability may be achieved under certain conditions than may be attained when the phase of the basic keying frequency is constantly being changed from line to line. It will be realized that any desired amount of phase change of the multiplexed signals may be produced by selection of a proper frequency whether the change occurs within a line or between lines, fields or frames in order to produce any desired dot pattern over the entire image.

In order to obtain certain dot patterns, it may be desirable to shift the phase of the multiplexed dots with respect to a fixed point in the horizontal scanning line at the end of each frame. A transmitter for performing this function is shown in block diagram form in Figure 6 in which primed numerals indicate parts that correspond to those illustrated in detail in Figure 1. The multivibrator 46′ may be adjusted in a well known manner so that it is triggered by every other vertical sync pulse derived from sync generator 94′ and, accordingly, the phase of the keying frequency is inverted at the end of each frame.

Figure 6:
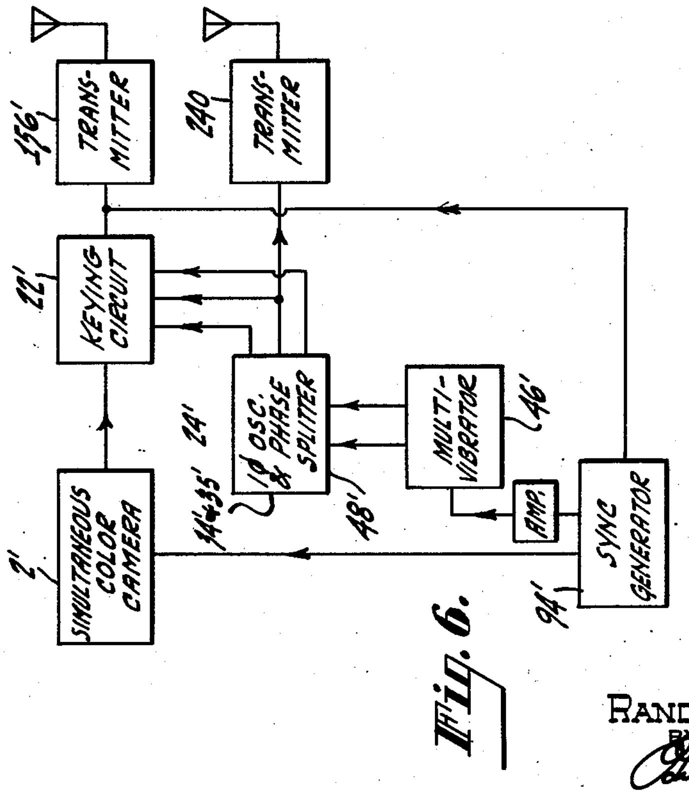
Figure 6 shows in block diagram form a transmitter in which the keying frequency is conveyed by a separate radio link and which is adapted to change the phasing of the multiplexed colored signals at the end of each frame.

The transmitter shown in Figure 6 also differs from that shown in Figure 1 in that the keying frequency is transmitted to the receiver by a separate radio link including a transmitter 240 instead of being sent in bursts on the back porch of the horizontal blanking pulse.

Figure 7:
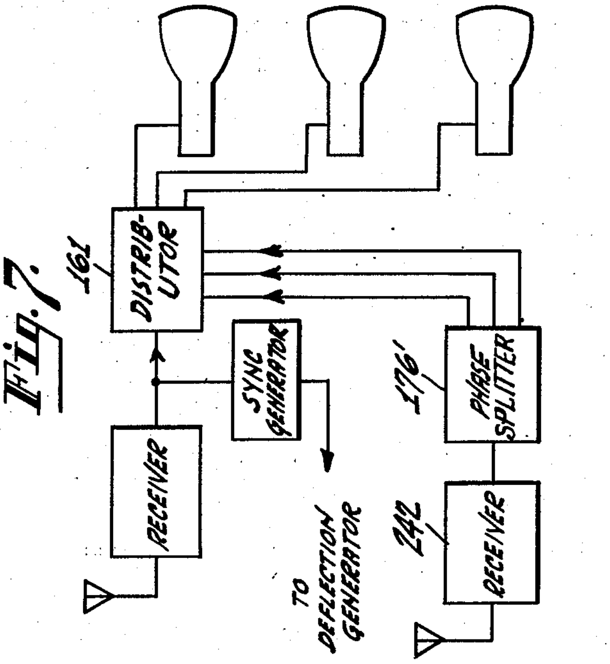
Figure 7 shows in block diagram form a receiver capable of reproducing colored images from the signals transmitted from the transmission system shown in Figure 6.

The receiver shown in Figure 7 operates in a manner similar to that of the receiver shown in Figure 2 with the exception that the receiver 242 is tuned to receive the signals transmitted by transmitter 240 of Figure 6, and the keying frequency which was modulated on the carrier transmitter 240 is supplied directly to phase splitter 176'. The output of the phase splitter 176' is applied to the distributor 161' and the multiplexed signals are supplied to the kinescopes for producing the different colored images as described in connection with Figure 2.

The establishment of other dot patterns in the field of the image are shown in Figures 8A and 8B in which the numbers enclosed within the dots indicate the field during which they occur. Only one color is shown, but it is to be understood that the others are treated in the same manner. The pattern of Figure 8A requires that the phase of the multiplexed groups of the different colors be changed with respect to the horizontal scanning interval at the end of each field by 270° and the pattern of Figure 8B requires a phase change of 90° between fields. A transmitter for performing this operation is illustrated in Figure 8 and corresponding components are the same as those in Figure 1. A vertical blanking pulse supplied by sync generator 250 is applied to the cameras 252, 254 and 256 via isolation amplifiers generally indicated by the numeral 258. Other synchronizing pulses are applied to the cameras via isolation amplifiers 260. The positive vertical blanking pulse is also applied to a differentiation circuit which may comprise a series resistor 262 and condenser 264. A negative triggering pulse is obtained at the trailing edge of the vertical blanking pulse by the provision of diode 266 in parallel with the resistor 262 and is applied to a ring multivibrator generally indicated by the numeral 270 via lead 272. The details of operation of this multivibrator may be found in the U. S. Patent No. 2,442,403 issued on June 1, 1948, to Flory. The multivibrator may be of the form shown or may be of any type in which a positive pulse is obtained successively on the output leads 274, 276, 278 and 280 in response to a succession of trigger pulses. The pulses so obtained are of such magnitude as to overcome the cut off bias present on the grids 282, 284, 286 and 288 of the gating tubes 290, 292, 294 and 296 when applied to the grids 298, 300, 302 and 304.

An oscillator 306 supplies the basic keying frequency to a phase splitter 308, which may be similar to that shown in Figure 1, and the differently phased outputs of the keying frequency thus developed are supplied to the negatively biased grids 282, 284, 286 and 288. The plates of the gating tubes 290, 292, 294 and 296 are tied to a common output lead 310 which is connected to a source of B+ through a tank circuit 311 that is tuned to the frequency of the oscillator 306. In this manner, different phases of the oscillator frequency are successively applied to transformer 312 which is coupled to a phase splitting network 314 which may be similar to phase splitter 48 as shown in Figure 1. The voltage waves of the oscillator frequency are supplied via leads 316, 318 and 320 in such manner as to key the cameras 252, 254 and 256 respectively during successive intervals. The multiplexed outputs of the cameras 252, 254 and 256 are applied to adder 322 by a common lead 324. This particular embodiment of the invention differs from that of Figure 1 in that the outputs of the cameras are keyed in succession, whereas the outputs of the cameras in Figure 1 are continuously supplied to a keying circuit, except for blanking intervals. In the particular arrangement shown in Figure 8, the synchroninzing of the receiver is achieved in a manner corresponding to that shown in Figure 1 in which bursts of the keying frequency available at lead 318 are supplied on the back porch of the horizontal blanking pulse.

In all the arrangements shown, the keying frequency has been sinusoidal in form but, for the purposes of the invention, it is readily apparent that sharp pulses may be provided by triggered multivibrators or other apparatus known to those skilled in the art.

Various other patterns employing the principles of this invention may be created by shifting the phase of the multiplexed dots corresponding to the various component colors in different sequences with respect to the lines, fields or frames than those shown without extending beyond the scope of this invention. The invention is a marked step forward in the art of color television in that it provides an elemental sequential system in which all the color information can be uniformly distributed in an image within four line interlaced fields in a manner that is compatible with present monochrome standards and which makes highly efficient use of a given bandwidth.

Having thus described my invention, what is claimed is:

1. In a color television system a transmitter comprising a generating means for deriving video signals corresponding to a first component color as the lines of a raster are being scanned, generating means for deriving signals corresponding to at least one other component color as the lines of a raster are being scanned, an output circuit, means for repeatedly applying the signals derived from said generating means in succession and at a frequency that is greater than the line scanning frequency to said output circuit with a predetermined phase with respect to a line scanning interval, and means for changing the phase with which the generated signals are applied to said output circuit during another line scanning interval.

2. An apparatus for double interlacing the colors of a scanned image in a color television system comprising means for deriving video signals corresponding to each of the colors to be transmitted as the object is scanned in a succession of horizontal parallel lines, an output channel, a keying circuit for successively applying during a brief period each of said video signals to said output channel in a predetermined order as a line is being scanned, the periods having a predetermined phase relationship to the line interval, and means for changing the phase of said keying circuit with respect to said line scanning interval on successive scannings of a given line so that periods of application of any given color made during the first scanning of a given line lie approximately midway between the periods of application of the same color the next time the line is scanned.

3. Apparatus for televising colored images comprising means for deriving video signals corresponding to a plurality of component colors as the lines of an image raster are scanned, means for time division multiplexing the video signals thus derived at a rate in excess of the line scanning frequency and with a predetermined phase with respect to any given line, means for applying the output of the time division multiplexing means to a single transmission channel, and means for changing the phase of operation of the multiplexing means so that the predetermined phase relationship with respect to any given line is shifted substantially 180° on successive scansions of that line.

4. A color television transmitter comprising means for deriving a plurality of signals each having a characteristic thereof varied in accordance with a different component color of an image as it is being scanned, a commutator, an output channel, said commutator being connected in such manner that the signals are periodically applied to said output channel, and means for changing the phase of the commutator.

5. A color television transmitter comprising a first means for deriving video signals as lines of a raster are scanned corresponding to a first color, second means for deriving video signals corresponding to a second color, and third means for deriving video signals corresponding to a third color, an electronic commutator having at least three input terminals and a single output terminal, each one of said first, second and third means being connected to a different input terminal, and means for changing the phase of said commutator with respect to the scanning of the lines of the raster.

6. A color television transmitter comprising a plurality of sources of video signals each corresponding to the intensity variations of a different color as successive lines of a raster are being scanned, an output channel, switching means for successively applying the video signals in a predetermined order to said output channel, the rate of switching being such that each one of said signals is successively supplied to the output channel a plurality of turns during a line scanning interval, and means for changing the phase of said switching means with respect to the line scanning operation so that for successive scansions of any given line the points representing the different colors are altered.

7. In a color television system, the combination of a multiplexer, means including said multiplexer for deriving time division multiplexed voltage waves in a predetermined sequence, each of said voltage waves being representative of the variation in intensity of a different component color as the lines of a raster are scanned, an output circuit, means for applying the voltage waves to said output circuit, and means for changing the phase of said multiplexer with respect to the line scanning interval so that the periods of application of the voltage waves representing any given color to said output circuit during one scansion of a given line are displaced from the periods of application of the voltage waves representing the same color during the next scansion of that line.

8. In a color television system, the combination of means for cyclically deriving during repeated uniformly spaced intervals as each line of the raster is scanned groups of signals, the signals of each group corresponding respectively to the intensities of different component colors in a given order and at predetermined points in a line, and means for changing the phase of said cyclic derivation with respect to the line scanning intervals between successive scansions of any given line so that the signals of each group correspond respectively to the intensities of the same component colors in the same order but at points in said line differing from the predetermined points.

9. In a television receiver adapted to reproduce images in color as the separate lines of a raster are being scanned, the combination of means having an input terminal said means including a plurality of signal conducting tubes, a source of alternating current energy, apparatus adapted to change the phase of said alternating energy with respect to the different line scanning intervals, and phase changing apparatus coupled between said source of alternating current and each of said tube such that the gain of said tubes is modulated by different phases of said alternating current energy.

10. In a television receiver adapted to reproduce images in color from signals that sequentially represent the intensities of different component colors as the lines of a raster are being scanned, a distributor including a plurality of tubes to which said signals are applied, a source of differently phased modulation frequency voltage waves, each differently phased voltage wave being applied so as to modulate the gain of a different one of said tubes, the phase relationship of said differently phased modulation voltage waves being different with respect to any given line of a raster on successive scansions of that line.

11. Color television apparatus, wherein the color is changed from element to element as each line is scanned, comprising electronic samplers for deriving time division multiplexed groups of signals in a predetermined order, the individual signals being representative of the individual elements forming a scanned line, each of said groups being representative of a different component color, and control means for cyclically changing the phase of said multiplexed signal groups with respect to the line scanning interval.

12. Apparatus for transmitting colored images comprising means for deriving video signals corresponding to a plurality of component colors as lines of an image raster are being scanned, means for time division multiplexing the video signals thus derived and applying them to a single transmission channel, and means for cyclically changing the phase of the multiplexed signals with respect to the line scanning interval.

13. A transmitter for use in color television wherein the signals transmitted are representative of the color information derived as the object to be televised is scanned at a predetermined line frequency comprising in combination a sampler including a plurality of tubes, a source of alternating current, the frequency of said current bearing a non-integral relationship to said line frequency, a phase splitter adapted to receive said alternating energy and provide it in differently phased relationship to a plurality of outputs, and means for individually modulating each of said tubes in accordance with the alternating current energy appearing at one of the outputs of said phase splitter.

14. In a television receiver adapted to reproduce images in color by scanning a raster at a given line frequency, the combination of means having an input terminal, said means including a plurality of signal conducting tubes coupled to said input terminal, a source of alternating current energy, a phase splitter adapted to receive said alternating current energy and to supply it to each of a plurality of outputs at different phases, the frequency of said alternating current energy bearing a non-integral relationship to said line frequency, and means for individually modulating each of said tubes with the alternating current energy appearing in one of the outputs of said phase splitter.

15. A television receiver as described in claim 9 wherein the phase changing apparatus is synchronized with a portion of the signals available at the input circuit.

16. In a color television transmitter wherein video signals are derived by scanning a plurality of lines in a frame, the combination of a source of differently phased waves having a frequency that is greater than the line scanning frequency, said waves having a different phase with respect to the line scanning interval during different scansions of any one line, means for generating a plurality of video signals each being representative of different color components, and means for varying the intensity of each of said differently phased waves with one of said video signals, an output channel and means for coupling the output of said intensity varying means to said channel.

17. Apparatus as described in claim 16 wherein said source of waves is an oscillator having a frequency that is equal to the frame repetition frequency times a whole number plus the frame frequency times a fraction.

18. Apparatus as described in claim 16 wherein said source of waves is an oscillator having a frequency that is equal to (N+1/2) times the frame scanning frequency where N is a whole integer.

19. Apparatus as described in claim 16 wherein said source of waves is an oscillator having a frequency that is (N+1/2) times the line scanning frequency.

20. Apparatus as described in claim 16 wherein said source of waves includes an oscillator that produces waves having a given frequency and means to change the phase of the output of said oscillator with respect to any given line between different scansions of that same line.

References Cited in the file of this patent

UNITED STATES PATENTS

| Number | Name | Date |
|---|---|---|
| 2,296,908 | Crosby | Sept. 29, 1942 |
| 2,333,969 | Alexanderson | Nov. 9, 1943 |
| 2,335,180 | Goldsmith | Nov. 23, 1943 |